United States Patent
Kumar et al.

(10) Patent No.: US 12,312,711 B2
(45) Date of Patent: May 27, 2025

(54) HIGH STRENGTH AND HIGH MODULUS CARBON FIBERS

(71) Applicant: Georgia Tech Research Corporation, Atlanta, GA (US)

(72) Inventors: Satish Kumar, Atlanta, GA (US); Han Gi Chae, Atlanta, GA (US); Bradley A. Newcomb, Atlanta, GA (US); Prabhakar V. Gulgunje, Atlanta, GA (US); Yaodong Liu, Atlanta, GA (US); Kishor K. Gupta, Atlanta, GA (US); Manjeshwar G. Kamath, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/373,557

(22) Filed: Sep. 27, 2023

(65) Prior Publication Data
US 2024/0026575 A1    Jan. 25, 2024

Related U.S. Application Data

(63) Continuation of application No. 16/984,273, filed on Aug. 4, 2020, now Pat. No. 11,773,514, which is a
(Continued)

(51) Int. Cl.
*D01F 1/09*    (2006.01)
*C08L 33/20*    (2006.01)
(Continued)

(52) U.S. Cl.
CPC .............. *D01F 9/225* (2013.01); *C08L 33/20* (2013.01); *D01F 1/09* (2013.01); *D01F 9/22* (2013.01);
(Continued)

(58) Field of Classification Search
CPC ... D01F 9/225; D01F 1/09; D01F 9/22; C08L 33/20; D02G 3/02; D02G 3/16; D02G 3/00; D10B 2101/12; D10B 2401/063
(Continued)

(56) References Cited

U.S. PATENT DOCUMENTS

| 4,753,777 | A | * | 6/1988 | Yoshinari | .................. D01F 9/14 422/150 |
| 2008/0118427 | A1 | * | 5/2008 | Leon y Leon | .......... C01B 32/00 423/447.2 |
| 2010/0266827 | A1 | * | 10/2010 | Oyama | .................... C08J 5/042 428/367 |

OTHER PUBLICATIONS

TDS for HexTow IM7 (Year: 2010).*

* cited by examiner

*Primary Examiner* — Matthew D Matzek
(74) *Attorney, Agent, or Firm* — Bryan W. Bockhop; Bockhop Intellectual Property Law, LLC

(57) ABSTRACT

In a method of making a carbon fiber, PAN (poly(acrylonitrile-co methacrylic acid)) is dissolved into a solvent to form a PAN solution. The PAN solution is extruded through a spinneret, thereby generating at least one precursor fiber. The precursor fiber is passed through a cold gelation medium, thereby causing the precursor fiber to gel. The precursor fiber is drawn to a predetermined draw ratio. The precursor fiber is continuously stabilized to form a stabilized fiber. The stabilized fiber is continuously carbonized thereby generating the carbon fiber. The carbon fiber is wound onto a spool. A carbon fiber has a fiber tensile strength in a range of 5.5 GPa to 5.83 GPa. The carbon fiber has a fiber tensile modulus in a range of 350 GPa to 375 GPa. The carbon fiber also has an effective diameter in a range of 5.1 µm to 5.2 µm.

5 Claims, 3 Drawing Sheets

Related U.S. Application Data continuation of application No. 15/514,300, filed as application No. PCT/US2015/054529 on Oct. 7, 2015, now abandoned.

(60) Provisional application No. 62/061,327, filed on Oct. 8, 2014.

(51) Int. Cl.
*D01F 9/22* (2006.01)
*D02G 3/02* (2006.01)
*D02G 3/16* (2006.01)

(52) U.S. Cl.
CPC ................. *D02G 3/02* (2013.01); *D02G 3/16* (2013.01); *D10B 2101/12* (2013.01); *D10B 2401/063* (2013.01)

(58) Field of Classification Search
USPC ........................................................ 428/367
See application file for complete search history.

HIGH STRENGTH AND HIGH MODULUS CARBON FIBERS

CROSS-REFERENCE TO RELATED APPLICATION(S)

This application is a continuation of and claims the benefit of U.S. patent application Ser. No. 16/984,273, filed Aug. 4, 2020 (now patented as U.S. Pat. No. 11,773,514), which is a continuation of U.S. patent application Ser. No. 15/514,300, filed Mar. 24, 2017 (now abandoned), which is US National Phase entry of International Application no. PCT/US15/54529, filed Oct. 7, 2015, which claims the benefit of U.S. Provisional Patent Application Ser. No. 62/061,327, filed Oct. 8, 2014, the entirety of each of which is hereby incorporated herein by reference.

STATEMENT OF GOVERNMENT INTEREST

This invention was made with government support under agreement No. W911NF-awarded by the Army Research Office. This invention was also made with government support under agreement No. FA9550-14-1-0194, awarded by the Air Force Office of Scientific Research. The government has certain rights in the invention.

BACKGROUND OF THE INVENTION

1. Field of the Invention

The present invention relates to carbon fiber technology and, more specifically to a carbon fiber having both a high tensile strength and a high tensile modulus.

2. Description of the Related Art

Polyacrylonitrile (PAN) polymer was commercialized by the DuPont Company in 1950 and is the only precursor material from which currently high strength carbon fibers are processed. These PAN based carbon fibers are now being used for significant structural applications in aerospace industry (e.g. in Boeing 787), for power generation (wind mill blades), and are increasingly being used in automobiles. Although carbon filaments were first used in light bulbs in late nineteenth century, research in modern carbon fibers started in 1959 in Japan and a key processing innovation occurred in England in 1964 resulting in high strength fibers. Following these developments, PAN based commercial T300 carbon fiber was introduced by the Toray Company of Japan in 1971 with a tensile strength of 2.5 GPa. Through material and process optimization, by 1980, the tensile strength of T300 carbon fiber was improved to 3.5 GPa. Currently, a widely used PAN based carbon fiber in aerospace industry, the IM7, has a tensile strength of 5.6 GPa and tensile modulus of 276 GPa. PAN based carbon fiber (T1100G) with a tensile strength of 6.6 GPa and tensile modulus of 324 GPa was recently announced. After more than 50 years of development, the tensile strength of high strength PAN based carbon fibers is still less than 10% of the theoretical strength of the carbon-carbon bond, and about 30% of the theoretical modulus. On the other hand, continuous pitch based carbon fibers can be manufactured with modulus as high as 965 GPa (>90% of the theoretical modulus). However, these high modulus pitch based carbon fibers have relatively low tensile strength (3.1 GPa), resulting from large graphitic grain boundaries and relatively low inter-planar shear modulus. Although it is possible to process PAN based carbon fibers with tensile modulus approaching 600 GPa (which is 57% of the theoretical value for graphite) via high temperature carbonization, this high tensile modulus is achieved at the expense of tensile strength. Clearly, there is room and need to increase the strength of carbon fibers while also increasing their modulus.

Man-made polymeric fibers are processed by melt or solution spinning. While PAN can be melt spun, currently all commercial PAN fiber production is based on solution spinning. Gel spinning is used for making high strength and high modulus polymeric fibers and can lead to fewer entanglements in the fiber than in the melt and conventional solution spun fiber of the same molecular weight. Through gel spinning, high molecular weight polymer solutions can be spun with higher molecular alignment than what can be achieved by conventional solution spinning, resulting in higher modulus of the carbonized fiber. However, existing methods of carbonization of gel spun PAN fibers have been carried out as a batch process, and there are no reports of gel spun fiber carbonization in a continuous process.

There is a need for a carbon fiber that has both a high tensile strength and a high tensile modulus.

Therefore, there is also a need for a method for continuous carbonization of gel spun PAN fibers.

SUMMARY OF THE INVENTION

The disadvantages of the prior art are overcome by the present invention which, in one aspect, is a carbon fiber that has a fiber tensile strength in a range of 5.5 GPa to 5.83 GPa. The carbon fiber has a fiber tensile modulus in a range of 350 GPa to 375 GPa. The carbon fiber also has an effective diameter in a range of 5.1 μm to 5.2 μm.

In another aspect, the invention is a tow that includes a plurality of carbon fibers. The carbon fibers have an average fiber tensile strength in a range of 5.5 GPa to 5.83 GPa. The carbon fibers have an average fiber tensile modulus in a range of 350 GPa to 375 GPa. The carbon fibers also have an average effective diameter in a range of 5.1 μm to 5.2 μm.

In another aspect, the invention is a carbon fiber characterized as having a fiber tensile strength that is at least 5.6 GPa, a fiber tensile modulus that is at least 350 GPa, and an effective diameter that is at least than 5.1 μm.

In another aspect, the invention is a carbon fiber characterized as having a fiber tensile strength that is at least 5.6 GPa, a fiber tensile modulus that is at least 350 GPa, and an effective diameter that is at least than 5.1 μm and having an oxidative thermal degradation temperature of at least 815° C.

In another aspect, the invention is a tow that consists of no more than 100 carbon fibers in which each of the carbon fibers is characterized as having a fiber tensile strength that is at least 5.8 GPa, a fiber tensile modulus that is at least 375 GPa, and an effective diameter that is at least than 5.1 μm and having an oxidative thermal degradation temperature of at least 815° C., wherein the fibers in the tow are without any surface treatment and without any sizing.

In yet another aspect, the invention is a method of making a carbon fiber, in which PAN (poly(acrylonitrile-co methacrylic acid)) is dissolved into a solvent to form a PAN solution. The PAN solution is extruded through a spinneret, thereby generating at least one precursor fiber. The precursor fiber is passed through a cold gelation medium, thereby causing the precursor fiber to gel. The precursor fiber is drawn to a predetermined draw ratio. The precursor fiber is continuously stabilized to form a stabilized fiber. The stabilized fiber is continuously carbonized thereby generating the carbon fiber. The carbon fiber is wound onto a spool.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
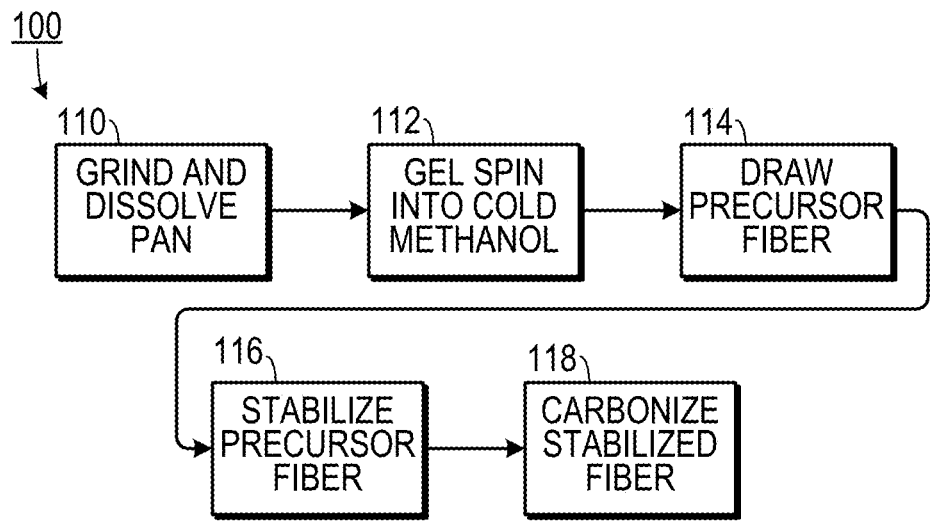
FIG. 1 is a flow chart showing one method of making a carbon fiber.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One representative embodiment of the invention includes a carbon fiber derived from gel spun polyacrylonitrile (PAN) that has a fiber tensile strength in a range of 5.5 GPa to 5.83 GPa, a fiber tensile modulus in a range of 350 GPa to 375 GPa, an effective diameter in a range of 5.1 μm to 5.2 μm, and an oxidative thermal degradation temperature of at least 815° C. Such a fiber can be arranged in a fiber tow with as few as 100 carbon fibers. The fiber tow can be woven into a fabric or can be held in a polymer matrix to give strength to components in a variety of applications (e.g., aerospace components and structural elements).

As shown in FIG. 1, one embodiment of a method 100 of making such a carbon fiber includes the steps of: grinding and dissolving PAN into a solvent 110; spinning the solution to form a precursor fiber and then gelling the precursor fiber in cold methanol 112; drawing the precursor fiber to a predetermined draw ratio 114; continuously stabilizing the precursor fiber in a stabilization oven to form a stabilized fiber 116; and continuously carbonizing the stabilized fiber to form a carbonized fiber 118.

Figure 2:
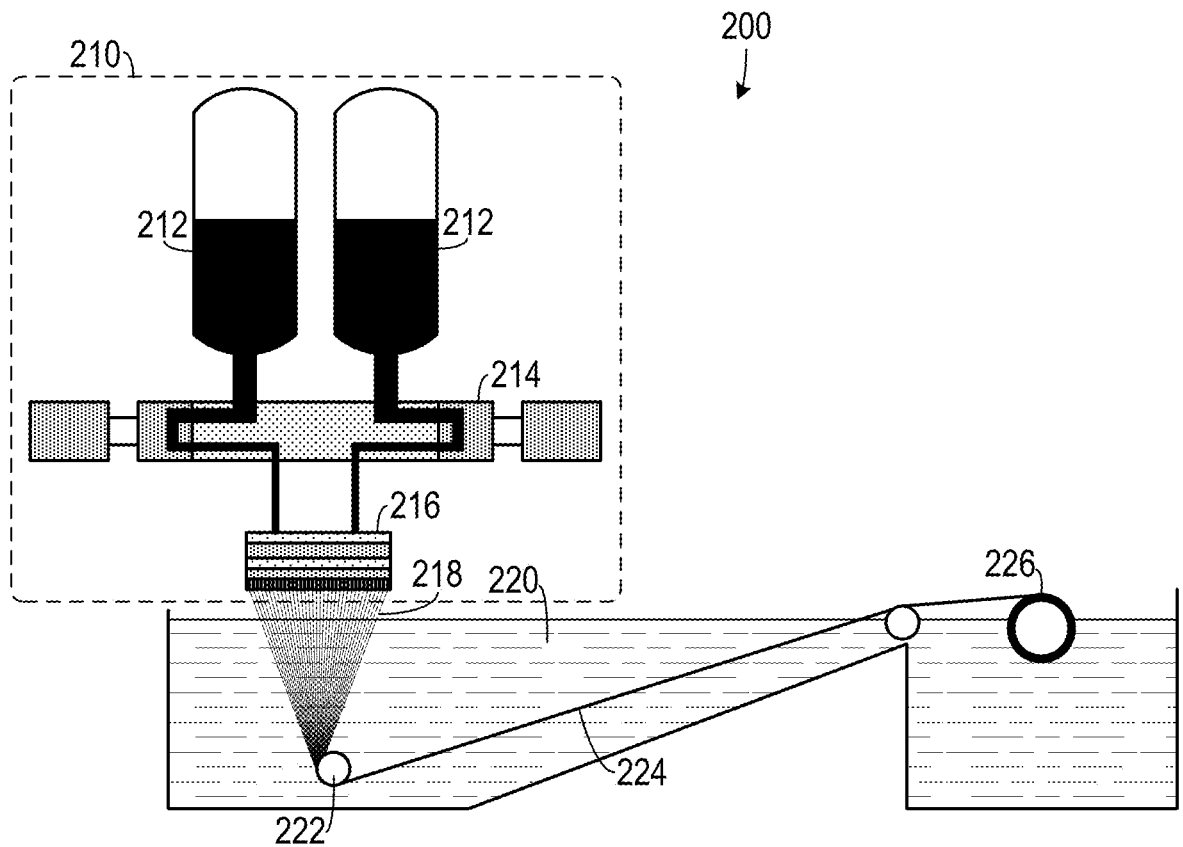
FIG. 2 is a schematic diagram of a PAN gel spinning apparatus.

In one experimental embodiment, as shown in FIG. 2, the PAN polymer used was poly(acrylonitrile-co-methacrylic acid) (PAN-co-MAA) copolymer, where the co polymer is 4.7 weight % MAA, with a viscosity average molecular weight of 513,000 g/mol (available from Japan Exlan Company, Osaka, Japan). The polymer was dissolved in N,N-dimethylformamide (DMF) at 90° C. at a concentration of 10.5 g/dl. In the experimental embodiment, the prepared/degassed PAN solution was transferred to pre-heated solution tank 212 at 75° C. at the spinning machine 210. The solution was stored in the tank 212 at 75° C. for 2 hours before spinning and was pressurized with nitrogen gas to 200 psi. The temperature profile for solution tank, metering pump block, and spin-pack jacket was 75° C., 75° C., and 85° C., respectively The prepared solution was spun using pump 214 that pumped the solution through a spin pack 216 equipped with a 100-hole spinneret (hole diameter of 200 μm). The spin-pack included a filter screen and spinneret. The solution filter screen employed a 20 μm stainless steel mesh filter. The spinneret included 100 holes with hole diameter of 200 μm and L/D of 6. The metering pump had a capacity of 3.2 cc/rev. In the initial stage of spinning, the metering pump was set at 50 rpm (the flow rate was 1.6 cc/min/hole). When the stable jetting of solution was obtained, the metering pump was set to 16.8 rpm (the flow rate was 0.5 cc/min/hole). The linear jet speed was 16 m/min.

The fiber 218 was spun into a gelation medium that included a methanol bath 220 maintained at −50° C. using an air gap between the surface of spinneret and gelation medium of about 2 cm (e.g., in one experiment, an air gap of 19 mm was used). The gelation medium 220 was substantially 100% methanol at −50° C. The gelation medium was circulated at a flow rate of 27 L/min.

The as-spun draw ratio was 3 and the post-spin draw ratio of the resulting fiber 224 was 8.2 (total draw ratio was 24.6). The fiber 224 was then rolled on a winder 226. The precursor fiber 224 was taken up at 48 m/min. Therefore, the spin draw ratio was 3.

Figure 3:
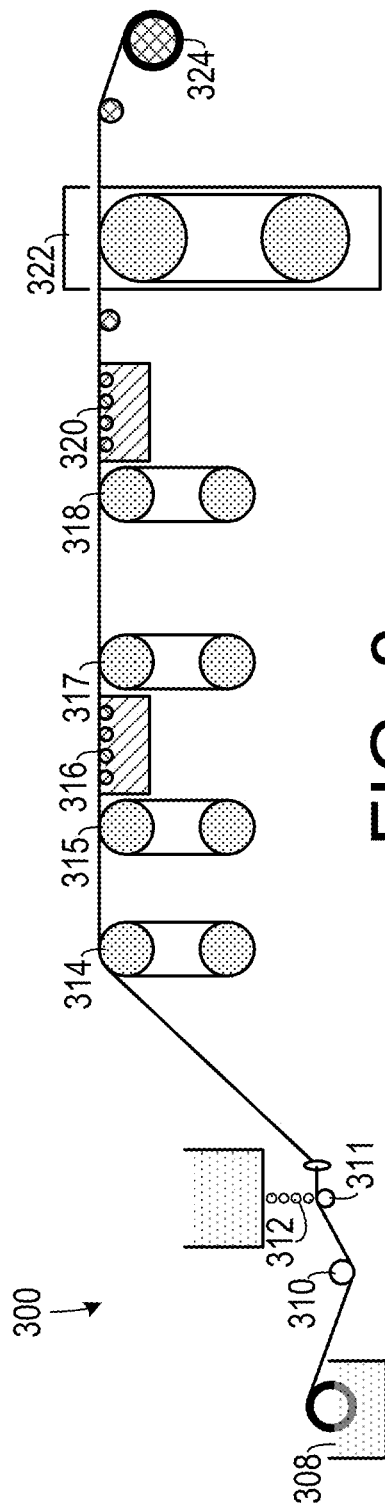
FIG. 3 is a schematic diagram of a fiber drawing line.

As shown in FIG. 3, post-spin drawing was conducted with a multi-step drawing machine 300 at the drawing temperature as high as 180° C. Initially, the stored precursor fiber was mounted on the unwinding stand of drawing line. While unwinding, one-third of the fiber spool was dipped in the chilled methanol (−30° C.) 308 and the unwinding speed was set at 2 m/min. The unwound fiber tow was passed through dancing roller 310 and guide roller 311 for controlling unwinding tension at 30 gf. At the guide roller 311, continuous stream of chilled methanol 311 was dripped onto the fiber tow to wash residual solvent (DMF).

The fiber tow was then wrapped three times at a godet 314 having rollers run at 2 m/min at room temperature. (There was no drawing between unwinder and godet 314). Then, the fiber tow was transferred to godet 315 where it was wrapped four times. The godet 315 rollers ran at 2.2 m/min at room temperature (resulting in a draw ratio between godet 314 and godet 315 of 1.1). Then, the fiber tow was passed through spin-finish application bath 316.

Figure 6:
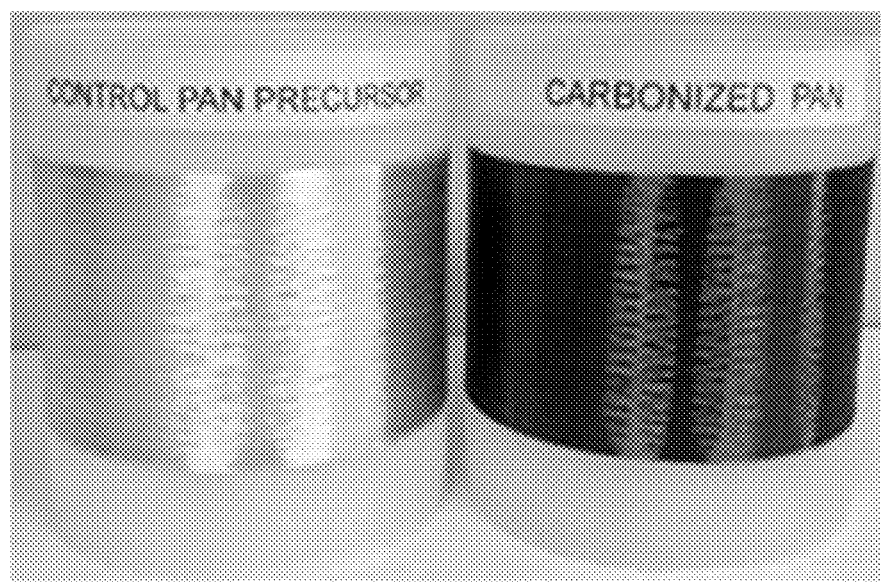
FIG. 6 is a photograph of a spool of a precursor fiber tow next to a spool of carbonized fiber tow.

The fiber tow was then wrapped 15 times at godet 317 having rollers that ran at 5.0 m/min at 110° C. (resulting in draw ratio between godet 315 and godet 317 of 2.27). The fiber tow was then wrapped four times at godet 318, having rollers that ran at 16.2 m/min at 180° C. (resulting in a draw ratio between godet 317 and godet 318 of 3.24). The fiber tow was then passed through spin-finish application bath 320 for a second spin-finish. The fiber tow was then wrapped 20 times at a dryer roller 322, which ran at 16.3 m/min (resulting in a draw ratio between godet 318 and dryer roller 322 of 1.01). The dryer rollers 322 were in the isothermal chamber where the air temperature was controlled at 110° C.). The dried fiber tow was wound on a spool 324 and the winding tension was controlled at 35 gf. A spool of precursor fiber next to a spool of carbonized fiber is shown in FIG. 6.

Figure 4:
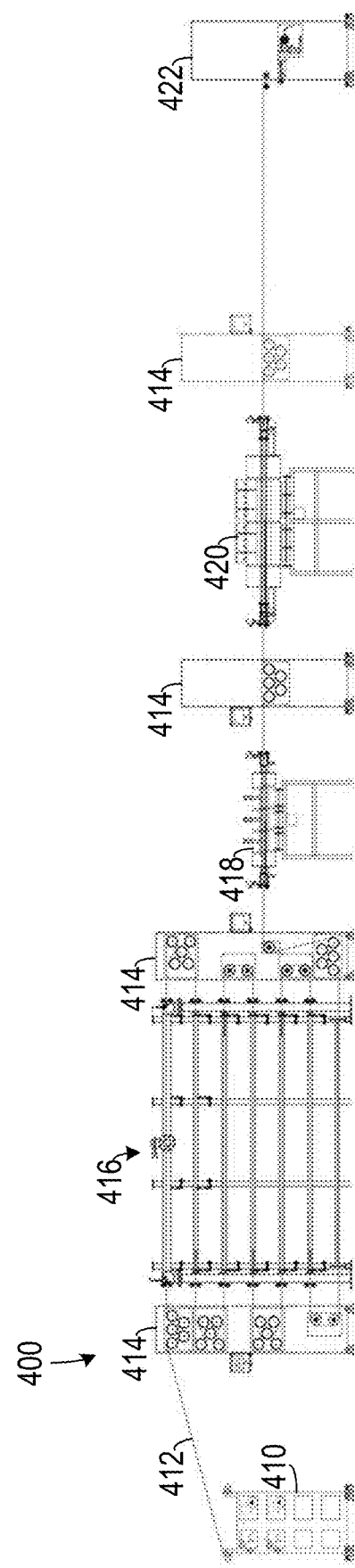
FIG. 4 is a schematic diagram of a continuous stabilization and carbonization line.

The fiber tow was then stabilized and carbonized. As shown in FIG. 4, in the stabilization and carbonization unit 400, the drawn fiber was mounted on the unwinding stand 410 at continuous stabilization and carbonization line and the unwound fiber tow 412 was conveyed to the first set of rollers 414 (each set of rollers is composed of five rollers). The unwinding tension was controlled at 10 MPa based on the precursor fiber diameter (11 μm). Then, the fiber tow was passed through six different stabilization ovens 416 with four different tension control zones. The detailed processing conditions are listed in the following table:

| Zone | Temp (° C.) | Strain (%) | Residence Time (min) |
|---|---|---|---|
| 1 | 180 | 6.0 | 20-44 |
| 2 | 190 | 5.6 | 20-44 |
| 3 | 200 | 5.6 | 20-44 |
| 4 | 210 |  | 20-44 |
| 5 | 230 | 4.9 | 20-44 |
| 6 | 250 |  | 20-44 |
| total |  | 24.0 | 120-264 |

Then, the stabilized fiber tow was passed through low temperature carbonization furnace 418, which included three separate temperature control zones. Strain was controlled using set of rollers before and after the furnace. Nitrogen gas was purged on both ends of processing tube to maintain the inert environment. The detailed processing conditions are listed as follows: Zone 1 Temp=500° C.; Zone 2 Temp=600° C.; Zone 3 Temp=675° C.; Strain (%)=20; and Residence Time (min)=1-10.

Then, the low temperature carbonized fiber tow was passed through high temperature carbonization furnace 420. The high temperature carbonization furnace has four separate temperature control zones. Strain was controlled using set of rollers before and after the furnace. Nitrogen gas was purged on both ends of processing tube and in the middle of processing tube to maintain the inert environment. The detailed processing conditions are as follows: Zone 1 Temp=1450° C.; Zone 2 Temp=1450° C.; Zone 3 Temp=1450° C.; Strain (%)=−2 to −4; and Residence Time (min)=1-10. The carbonized fiber tow was then wound on 3" diameter polypropylene tube at a constant winding tension of 25 gf at winder 422.

Using this method results in carbon fibers that are without any surface treatment and that are without any sizing.

In one experimental embodiment, the tensile properties and structural parameters of the precursor fiber are listed in the table below. It is noted that the tensile modulus of this gel spun PAN precursor is 20.7 GPa. This value is significantly higher than the modulus value achieved in the solution spun PAN fiber, which is typically in the range of 7 to 14 GPa. Higher tensile modulus in the gel spun fiber is a result of significantly higher draw ratios achieved in gel spinning than in solution spinning.

|  |  | PAN precursor fiber |
|---|---|---|
| Effective diameter (μm) |  | 11.0 ± 0.8 |
| Density (g/cm$^3$) |  | 1.207 |
| Tensile properties$^a$ | Strength (GPa) | 1.0 ± 0.1 |
|  | Modulus (GPa) | 20.7 ± 1.1 |
|  | Elongation at break (%) | 9.4 ± 1.5 |
| WAXD analysis | d-spacing$_{(200, 110)}$ (nm) | 0.527 |
|  | Crystallinity (%) | 64 |
|  | Crystal size L$_{(200, 110)}$ (nm) | 15.7 |
|  | FWHM$_{azi, (200, 110)}$ (degrees) | 6.7 |

Using this method, carbon fibers have been produced in multiple gel spinning runs of precursor fibers and carbonization with average tensile strength values in the range of 5.5 to 5.8 GPa and tensile modulus in the range of 354 to 375 GPa. [added from above [[[[an effective diameter in a range of 5.1 μm to 5.2 μm, and an oxidative thermal degradation temperature of at least 815° C. There are no other fibers with this combination of tensile strength, modulus and fiber diameter. For example, the tensile strength of current PAN based commercial fiber (M40JB) with a modulus of 377 GPa is only 4.4 GPa. However, the higher tensile modulus in the inventive gel spun PAN based carbon fiber as compared to the IM7 carbon fiber is without any loss in tensile strength.

Figure 5:
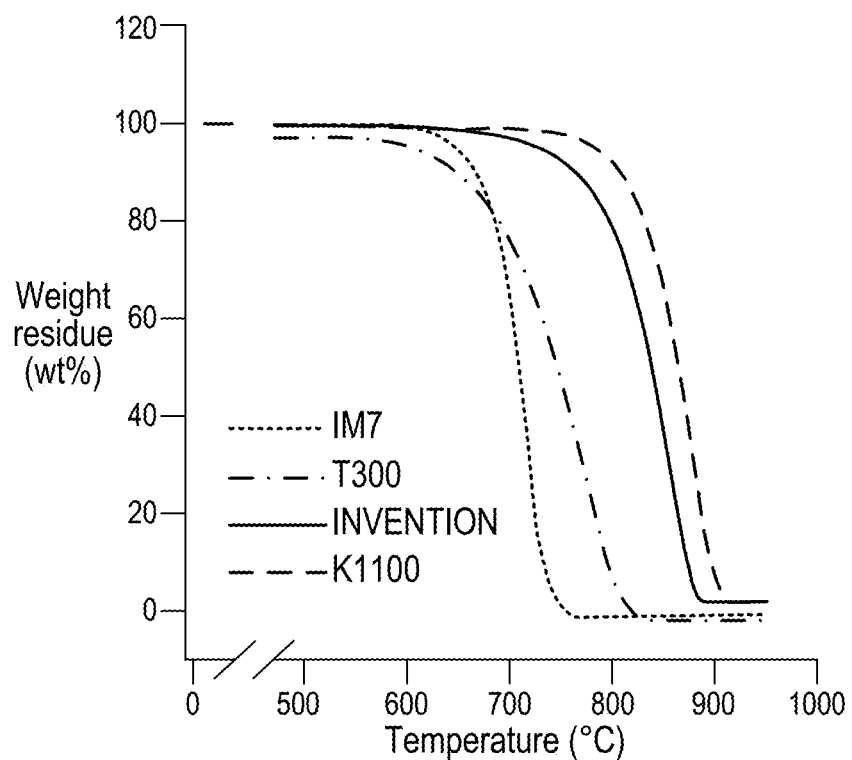
FIG. 5 is a graph showing oxidative thermal degradation temperatures of several different carbon fiber types.

The degradation temperatures of various carbon fibers are shown in the graph in FIG. 5. The following table compares characteristics of existing carbon fibers to those of one experimental embodiment of the carbon fiber of the present invention:

|  |  | PAN based carbon fibers | | | Pitch-based carbon fiber K-1100 |
|---|---|---|---|---|---|
|  |  | carbon fiber of the present invention | IM7 | T300 |  |
| Cross-sectional area (μm)$^2$ |  | 19.6-21.2 | 21.2 | 38.5 | 113.1 |
| Density (g/cm$^3$) |  | 1.77-1.79 | 1.78 | 1.76 | 2.20 |
| Tensile properties | Strength (GPa) | 5.5-5.8 | 5.6 | 3.6 | 3.1 |
|  | Modulus (GPa) | 354-375 | 276 | 230 | 965 |
| Oxidative thermal degradation temperature (° C.) |  | 815 | 714 | 771 | 877 |
| WAXD analysis* | d$_{002}$ (nm) | 0.344 | 0.348 | 0.349 | 0.337 |
|  | L$_{002}$ (nm) | 1.9 | 1.6 | 1.4 | 26.6 |
|  | L$_{10}$ (nm) | 2.5 | 2.1 | 2.0 | 21.1 |
|  | FWHM$_{azi, 002}$ (degrees) | 23.1 | 30.3 | 35.0 | 0.5-1.0 |
| Raman intensity ratio | I$_G$/I$_D$ | 0.46 | 0.43 | 0.39 | 2.00 |

*d$_{002}$, L$_{002}$, and L$_{10}$ are inter-planar graphitic spacing, crystal size perpendicular to (002), and crystal size within graphitic plane along the fiber axis, respectively.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A plurality of carbon fibers arranged in a tow of no more than 100 carbon fibers in which each of the carbon fibers consists of a polyacrylonitrile-based material and that is characterized as having a fiber tensile strength that is at least 5.6 GPa, a fiber tensile modulus that is at least 350 GPa, and an effective diameter that is at least 5.1 μm and having an oxidative thermal degradation temperature of at least 815° C., wherein the fibers in the tow are without any surface treatment and without any sizing.

2. The carbon fiber of claim 1, wherein the tensile strength is at least 5.8 GPa.

3. The carbon fiber of claim 1, wherein the fiber tensile modulus is at least 375 GPa.

4. A plurality of carbon fibers arranged in a tow of no more than 100 carbon fibers in which each of the carbon fibers consists of a polyacrylonitrile-based material and that is characterized as having a fiber tensile strength that is at least 5.8 GPa, a fiber tensile modulus that is at least 375 GPa, and an effective diameter that is at least 5.1 μm and having an oxidative thermal degradation temperature of at least 815° C., wherein the fibers in the tow are without any surface treatment and without any sizing.

5. A tow consisting of no more than 100 carbon fibers in which each of the carbon fibers is characterized as having a fiber tensile strength that is at least 5.8 GPa, a fiber tensile modulus that is at least 375 GPa, and an effective diameter that is at least 5.1 μm and having an oxidative thermal degradation temperature of at least 815° C., wherein the fibers in the tow are without any surface treatment and without any sizing.

* * * * *